United States Patent [19]

Childress et al.

[11] Patent Number: 4,925,057

[45] Date of Patent: May 15, 1990

[54] FUEL TANK HAVING BALLISTIC PROTECTION BLADDER

[75] Inventors: James J. Childress, Federal Way, Wash.; John Holtrop, Ridgecrest, Calif.

[73] Assignee: The Boeing Company, Seattle, Wash.

[21] Appl. No.: 355,698

[22] Filed: May 23, 1989

[51] Int. Cl.$^5$ .............................................. B65D 90/04
[52] U.S. Cl. ...................... 220/426; 169/45; 169/66; 220/85 B; 220/88 B; 244/135 R
[58] Field of Search .................... 169/45, 66; 114/343; 220/1 B, 85 B, 85 S, 88 A, 88 B, 88 R, 403, 426; 244/135 B, 135 R; 280/832, 834

[56] References Cited

U.S. PATENT DOCUMENTS

| | | | |
|---|---|---|---|
| 2,621,719 | 12/1952 | Eaton et al. | |
| 2,735,635 | 2/1956 | Hoffman | |
| 2,889,955 | 6/1959 | Naulty et al. | |
| 3,687,329 | 8/1972 | Baum | 169/66 |
| 3,698,597 | 10/1972 | Burke | 220/426 |
| 3,737,125 | 6/1973 | Farmer | |
| 3,831,318 | 8/1974 | Richmond | 169/45 |
| 3,838,576 | 10/1974 | Geffs | 220/88 B |
| 3,924,773 | 12/1975 | Wilkinson | 220/88 B |
| 4,569,399 | 2/1986 | Spector et al. | 220/88 R |
| 4,615,455 | 10/1986 | Tansill | 220/85 B |

FOREIGN PATENT DOCUMENTS

0134326   8/1982   Japan ..................................... 169/66

Primary Examiner—Jimmy G. Foster
Attorney, Agent, or Firm—Seed and Berry

[57] ABSTRACT

A plurality of resilient bladders filled with an inert gas line the walls of a fuel tank to protect fuel in the tank from explosion or leakage in the event that the tank is punctured by a ballistic projectile. The thickness of the bladders is controlled by a plurality of cords extending from one side of each bladder to the other. The inert gas is continuously supplied to the bladders so that the gas escaping from a puncture in a bladder prevents fuel from leaking from the tank through the puncture. During normal operation, the gas is vented into the tank to fill the ullage space of the tank with the insert gas. A conduit extends into the tank through the bladder. The walls of the bladder are sealed to each other around the conduit, thereby making it unnecessary to seal the walls of the bladder to the conduit.

16 Claims, 5 Drawing Sheets

FUEL TANK HAVING BALLISTIC PROTECTION BLADDER

FIELD OF THE INVENTION

This invention relates to fuel tanks, and more particularly, to a fuel tank that can withstand strikes from ballistic projectiles.

BACKGROUND ART

Combat aircraft have always been vulnerable to fuel tank explosions caused by projectiles from enemy aircraft and ground artillery penetrating the fuel tank. A number of diverse approaches have been attempted to protect fuel tanks of combat aircraft from ballistic strikes. One technique has been to shield the tanks with protective armor to prevent ballistic projectiles from penetrating the tanks. However, this approach is not very well suited to aircraft applications where weight is an important consideration. Other approaches attempt to minimize damage once the projectile has penetrated the fuel tanks. For example, attempts have been made to prevent the fuel from exploding by fire-extinguishing systems that flood the tank with either inert gas, such as nitrogen or a fireextinguishing foam. These approaches are not totally effective, and they add undesirable weight to the aircraft. Fuel tanks have also been lined with rubberized membranes to seal the tanks against fuel leakage after being penetrated. However, this approach does nothing to prevent the fuel from exploding, and it is only effective for relatively small punctures.

Although fuel tanks can be penetrated by projectiles, the resulting entry holes in the tanks are relatively small. However, the projectiles can produce substantially larger holes and tears by a phenomena known as the "hydraulic ram effect." A high-speed projectile penetrating a fuel tank has a large amount of kinetic energy. As the projectile passes through the fuel in the tank, it is slowed by the fuel and its kinetic energy is transferred to the fuel as a pressure wave. The pressure wave then strikes the walls of the fuel tank over a relatively large area and can therefore create a relatively large hole or tear in the wall of the tank. The above-described approaches to protecting fuel tanks from ballistic projectiles do not address the hydraulic ram effect.

Protection systems that line the tank with armor or a sealing membrane are more vulnerable to the hydraulic ram effect where the tank must be penetrated by conduits such as fuel and vent lines. The tank must be sealed around the conduits to prevent leakage, and the high-intensity pressure wave produced by the hydraulic ram effect can rupture the seal and start a tear in the tank. It is also expensive and time-consuming to extend conduits through the tank and then seal the tank around the conduits.

Although the above-described problems may be most acute in fuel tanks for combat aircraft, similar problems exist for any vehicle, such as trucks, tanks, boats, etc., having a fuel tank that is subject to puncture by ballistic projectiles.

DISCLOSURE OF THE INVENTION

It is an object of the invention to provide a method and an apparatus that allow a fuel tank to withstand penetration by ballistic projectiles without allowing the fuel to either explode or leak from the tank.

It is another object of the invention to provide a fuel tank protection system that is light in weight so that it is suitable for use in combat aircraft.

It is still another object of the invention to provide a fuel tank protection system that absorbs pressure pulses generated by the hydraulic ram effect when the tank is punctured by a high-speed ballistic projectile.

It is a further object of the invention to provide a structure for allowing conduit to penetrate the wall of a fuel tank without making the tank vulnerable to rupture by pressure pulses generated by the hydraulic ram effect.

These and other objects of the invention are provided by a flexible bladder lining the inside of the tank. The bladder is filled with a pressurized inert gas, and a plurality of nonresilient webs preferably extend from one side of the bladder to the other to control the thickness of the bladder. In the event that the bladder is continuously supplied with the inert gas, the bladder may include a relief valve opening into the interior of the tank so that the ullage space of the tank is filled with the inert gas. Continuously supplying inert gas to the bladder also prevents fuel from escaping through a puncture in the bladder, since gas flowing into the tank through the puncture prevents fuel from flowing into the bladder through the puncture. The bladder is preferably depressurized to collapse the bladder when the tank is full of fuel and then pressurized to expand the bladder as fuel is removed from the tank. In the event that a conduit must penetrate the tank, the walls of the bladder are preferably sealed to each other around the conduit in the area where the conduit extends through the bladder, thereby making it unnecessary to provide a seal between the conduit and the walls of the bladder. The walls of the bladder that are sealed to each other may be attached to a connection flange extending radially from the conduit around its circumference, thereby securing the bladder to the conduit. The interior wall of the bladder preferably forms a lobe around the conduit so that the interior wall of the bladder closely surrounds the conduit. Although the tank may be lined with a single bladder, it is preferably lined with a plurality of nonoverlapping bladders that are pneumatically isolated from each other so that a puncture of one of the bladders does not affect the pressurization of the remaining bladders.

BEST MODE FOR CARRYING OUT THE INVENTION

Figure 1:
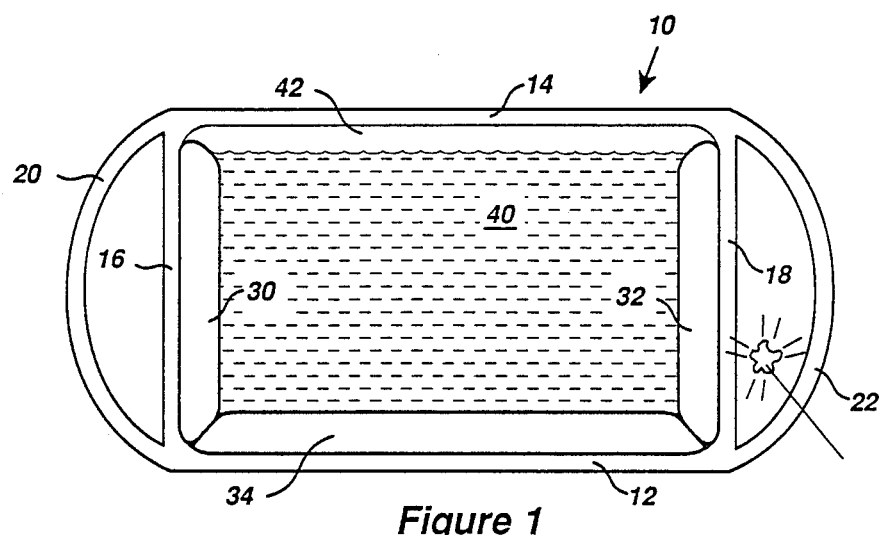
FIG. 1 is a cross-sectional view of an aircraft fuel tank lined with the inventive ballistic protection bladder.

A typical aircraft fuel tank 10 is illustrated in FIG. 1. The tank is formed by a bottom 12, a top 14, two end walls 16, 18, and two end walls (not shown). A "dry bay" is formed between the side walls 16, 18 and respective outwardly curved bulkheads 20, 22. The walls 16, 18 and bottom 12 of the tank 10 are lined with resilient bladders 30, 32, and 34, respectively. The tank 10 contains a quantity of fuel 40 and an unfilled space above the fuel known as the "ullage" 42.

Figure 3:
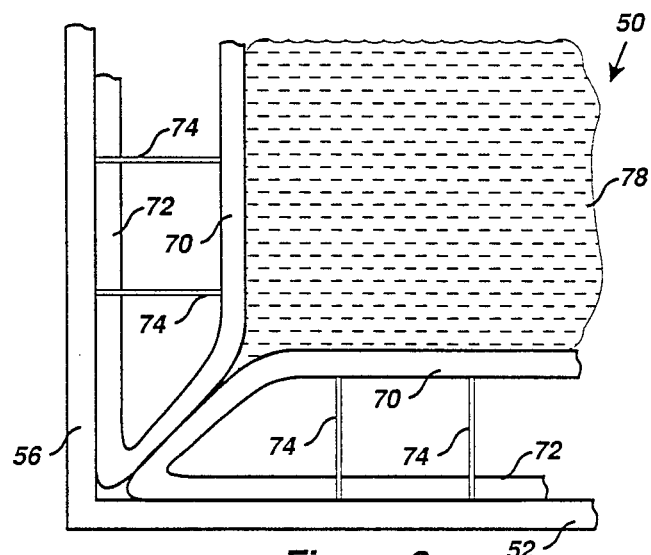
FIG. 3 is an exploded cross-sectional view showing the structural details of the inventive ballistic protection bladder.
Figure 2:
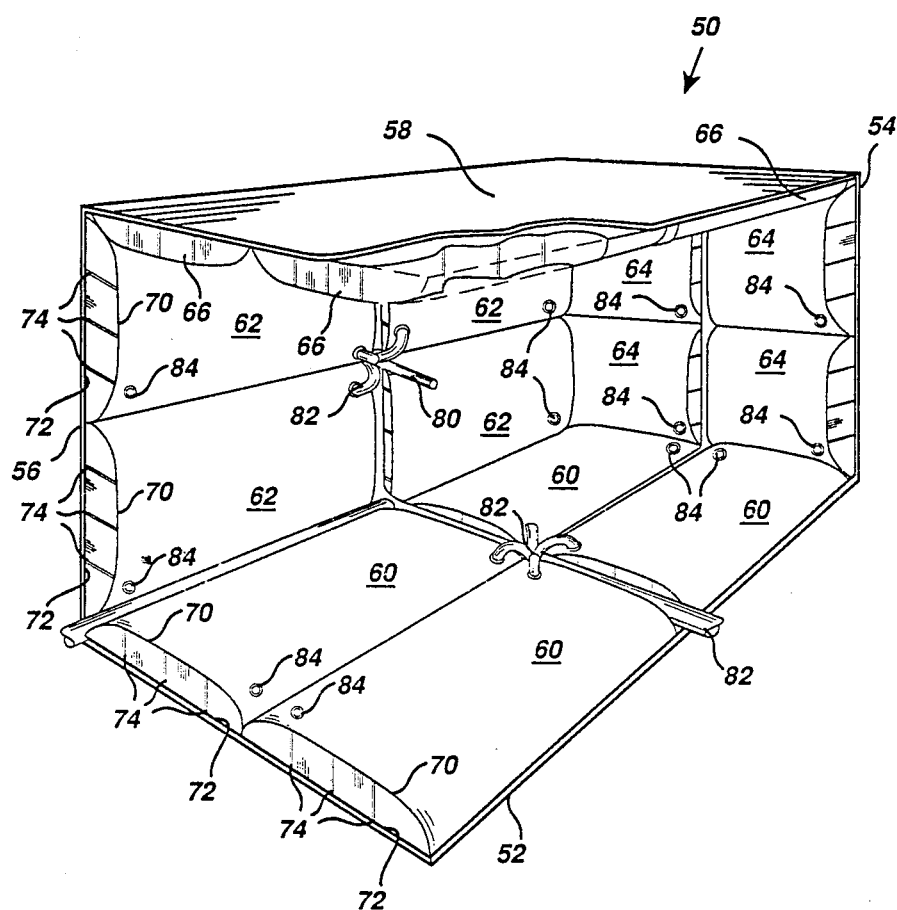
FIG. 2 is a isometric view of another fuel tank lined with the inventive ballistic protection bladder showing conduits penetrating the walls of the tank.

The structural details of one embodiment of the inventive ballistic protection bladder are illustrated in FIGS. 2 and 3. The tank 50 of FIGS. 2 and 3 includes a bottom 52, end walls 54, side walls 56, and a top 58. A first plurality of bladders 60 line the bottom 52 of the tank. Similarly, a second plurality of bladders 62 line the side wall of the tank 56. A third plurality of bladders 64 line the inside of the end walls 54 of the tank 50. Finally, a fourth plurality of bladders 66 line the inside of the top 58 of the tank. The bladders 60-66 are formed by inner and outer walls 70, 72, respectively, which are formed of a flexible material that may also be resilient. Inflation restriction webs or cords 74 extend between the inner and outer walls 70, 72 to control the thickness of the bladders 60-66 by preventing over-inflation. The tank 50 is filled with fuel 78 (FIG. 3).

With reference to FIG. 2, a conduit 80 for conveying fuel from the tank 50 extends through the side wall 56 of the tank 50 and through the bladder 62, as explained in greater detail below. A second set of conduits 82 also extend through a side wall of the fuel tank 50 and extend to respective ports in the bladders 60-66. The conduits 82 are connected to a suitable source of inert gas, such as nitrogen. For example, the inert gas source may be a tank containing such gas or it may be an on-board, gas-generating system commonly found in turbine aircraft.

In operation, as the inert gas flows into the bladders 60-66, the pressure of the gas in the bladders 60-66 increases. When the pressure reaches the relief pressure of the valves 84, the inert gas is released into the tank 50, where it fills up the ullage space in the tank. The inert gas thus displaces oxygen in the ullage to prevent combustion of the fuel in the tank or fuel vapor in the ullage.

Figure 4A:
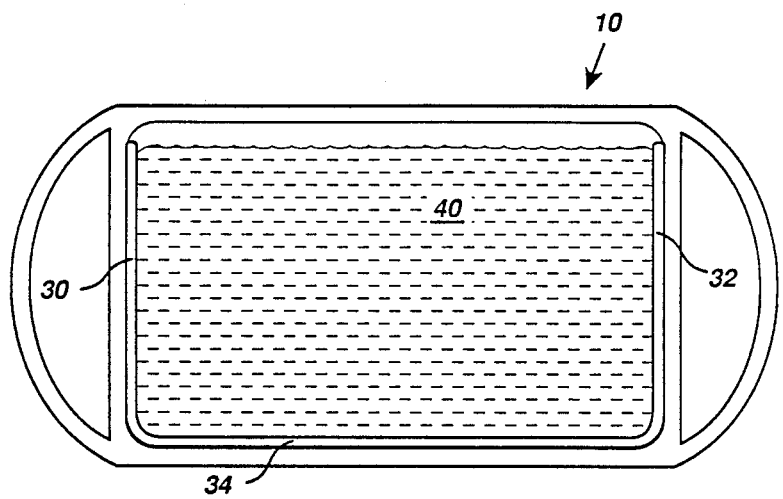
FIG. 4A and 4B are respective cross-sectional views of an aircraft fuel tank lined with the inventive ballistic protection bladder at the start of a mission and after some of the fuel in the tank has been burned.
Figure 4B:
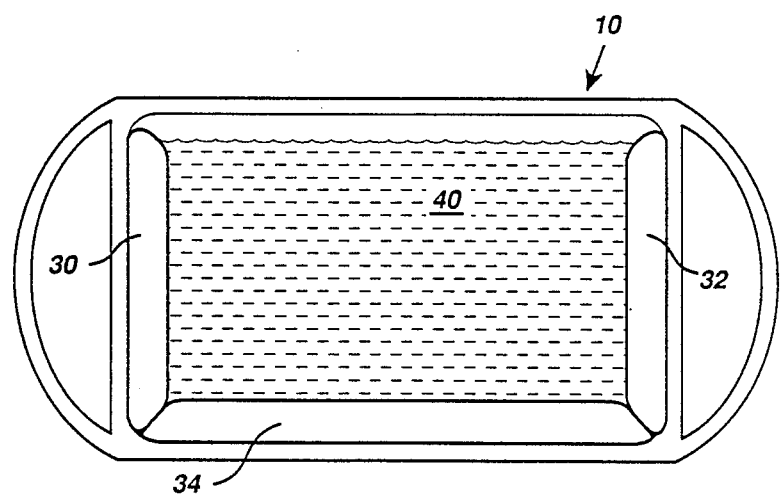

Although the bladders may be continuously inflated, they may also be uninflated during the initial portion of a combat mission when the fuel tank is full of fuel. As illustrated in FIG. 4A, the tank 10 of FIG. 1 is shown at the start of a combat mission when it is substantially full of fuel 40. At this time, the bladders 30-34 are uninflated, thereby increasing the capacity of the tank 10. It is often not necessary to inflate the bladders 30-34 at the start of a mission since there is often little risk of hostile action until the aircraft has flown a considerable distance and thus burned much of the fuel 40 in the tank 10. When sufficient fuel 40 in the tank 10 has been burned so that the entire capacity of the tank 10 is not needed, the bladders 30-34 may be inflated, as illustrated in FIG. 4B.

Figure 5A:
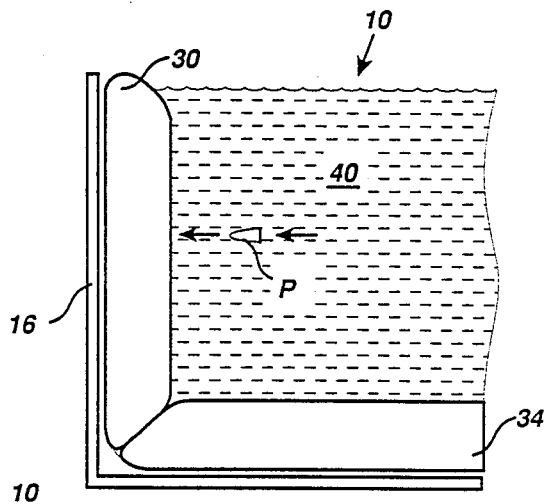
FIG. 5A and 5B are cross-sectional views illustrating the manner in which the inventive ballistic protection bladder absorbs pressure pulses generated by the hydraulic ram effect.
Figure 5B:
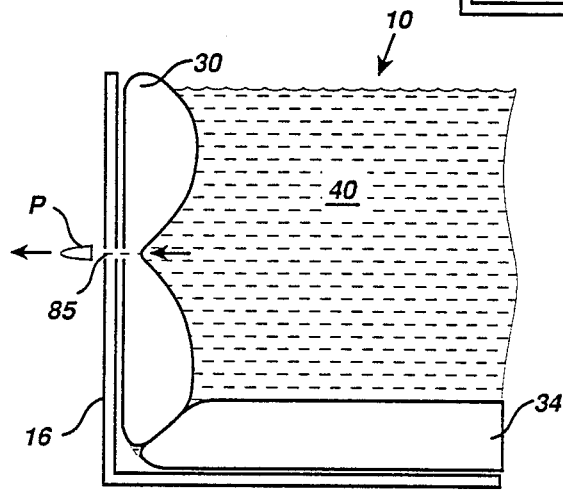

The manner in which the inventive ballistic protection bladders operate to prevent fuel tanks from rupturing is best understood with reference to FIG. 5. When a high-speed ballistic projectile P penetrates a tank filled with fuel, the projectile P contains a great deal of kinetic energy. As the projectile P travels through the fuel 40, the drag of the fuel 40 slows the projectile P so that the kinetic energy of the projectile P is transferred to the fuel 40 in the form of a localized pressure wave known as the "hydraulic ram effect." As illustrated in FIG. 5B, the projectile P may pass through the bladder 30 and side wall 16 of the tank 10, thereby forming a relatively small hole 85. However, the pressure wave covers a substantially larger area and is capable of forming a relatively large hole in the wall 16 of the tank 10. The bladder 30 absorbs the pressure wave by compressing over a relatively large area commensurate with the size of the pressure wave, as illustrated in FIG. 5B. The bladders 30, 34 thus absorb the pressure wave due to the hydraulic ram effect so that it does not reach the wall 16 of the tank 10.

Figure 6:
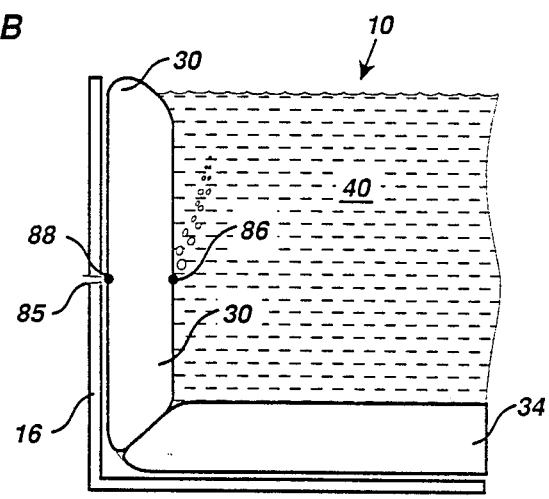
FIG. 6 is a cross-sectional view illustrating the manner in which the inventive ballistic protection bladder seals the tank against leakage after being penetrated by a projectile.

The inventive ballistic protection bladder also seals the tank to prevent the fuel 40 from leaking from the tank in the event of a puncture by a projectile, as illustrated in FIG. 6. The bladder 30 contains an inlet puncture 86 and an outlet puncture 88 as well as the hole 85 through the side wall 16 of the tank 10. However, as long as pressurized gas is continuously supplied to the bladder 30, the gas will flow from the bladder 30 through the inlet puncture 86 and into the tank. As long as the gas is flowing out through the inlet puncture 86, fuel cannot flow into the bladder 30 through the inlet puncture 86. Thus, the bladder 30, coupled with the gas flowing from the bladder 30, prevents the fuel 40 from leaking from the tank 10.

Figure 7:
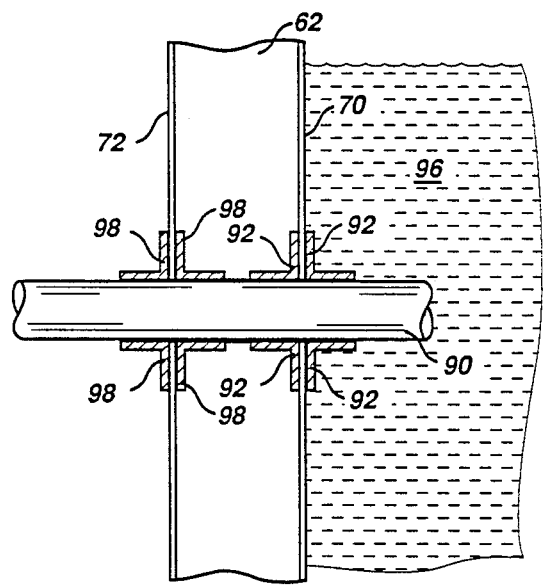
FIG. 7 is a cross-sectional view of a prior art technique for sealing a conduit to the wall of a fuel tank at the location where the conduit penetrates the wall of the tank.

As illustrated in FIG. 2, it is necessary for conduits, such as fuel conduit 80 and inert gas conduit 82, to penetrate the walls of the tank. The conduits 80, 82 must also penetrate the bladders 60-66 since the bladders 60-66 line the walls of the tank. One structure for allowing the conduit 80 to penetrate a bladder 62 is illustrated in FIG. 7. As explained above and illustrated in FIG. 3, the bladder 62 is formed by inner and outer walls 70, 72, respectively. Aligned holes are formed in the walls 70, 72 to receive the conduit 80. The inner wall 70 is sandwiched between a pair of connection flanges 92 that are secured to and extend radially from the conduit 90. A suitable sealant is applied between the inner wall 70 and the flanges 2 to prevent fuel 96 from leaking from the tank. Similarly, the outer wall 72 of the bladder 62 is sandwiched between a second pair of flanges 98 that are also secured to and extend radially from the conduit 90.

The structure illustrated in FIG. 7 suffers from a number of limitations. First, it is relatively expensive to fabricate and assemble the structure shown in FIG. 7 since it requires the manufacture and assembly of four connection flanges, the forming of two aligned holes in the bladder 62, and the sealing of both walls of the bladder 62 between the flanges 92, 98. Even more significantly, however, the interconnections between the walls 70, 72 and the flanges 92, 98, respectively, are susceptible to rupture by pressure pulses generated by the hydraulic ram effect. More specifically, the high-intensity pressure wave generated by the hydraulic ram effect can apply sufficient force to the walls of the bladder 62 to either tear the walls 70, 72 at their junctions to the connection flanges 92, 98 or put the walls 70, 72 from between the flanges 92, 98, respectively. The external wall 56 (FIG. 2) of the tank is then exposed to the pressure pulse, which may be of sufficient intensity to tear a hole in the wall 56.

Figure 8:
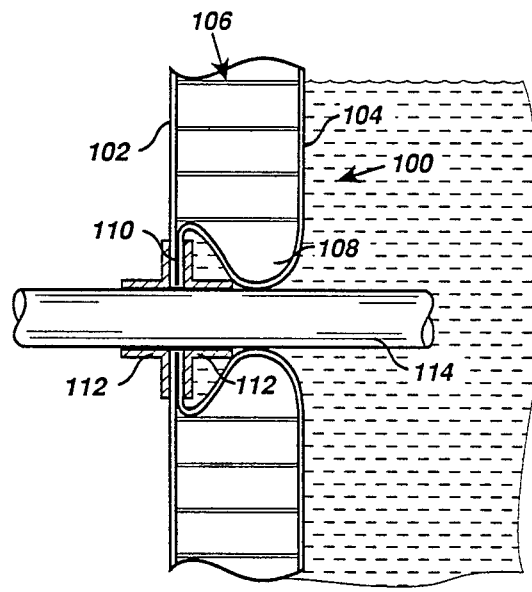
FIG. 8 is a cross-sectional view of the inventive technique for sealing a conduit to the wall of a fuel tank at the location where the conduit penetrates the wall of the tank without making the tank vulnerable to rupture from pressure pulses generated by the hydraulic ram effect.

A structure that avoids the disadvantages of the structure in FIG. 7 is illustrated in FIG. 8. In the embodiment of FIG. 8, a bladder 100 is formed by an outer wall 102 and an inner wall 104 interconnected by inflation-restricting cords 106. The inner wall 104 extends beyond the outer wall 102 to form a lobe 108. The inner wall 104 is then sealed to the outer wall 102 in the area 110 and the area of interconnection between the walls 102, 104 is sandwiched between a pair of connection flanges 112. The connection flanges 112, like the connection flanges 92, 98 shown in FIG. 7, are secured to and extend radially from a conduit 114.

The bladder 100 does not have inflation-restricting cords 106 connected to the portion of the inner wall 104 forming the lobe 108. As a result, the lobe 108 surrounds the conduit 114 and shields the interconnection between the bladder 100 and interconnection flanges 112 from pressure pulses induced by the hydraulic ram effect. The lobe 108 thus substantially prevents the bladder 100 from either tearing at its junction with the interconnection flanges 112 or being pulled from the interconnection flanges 112. Also, more effective sealing can be provided between the inner and outer walls 102, 104 of the bladder 100 than can be achieved between the inner and outer walls 70, 72 and the interconnection flanges 92, 98 (FIG. 7). As a result, the interconnection structure illustrated in FIG. 8 is far more able to resist the hydraulic ram effect as compared to the embodiment of FIG. 7.

The ballistic protection bladder thus allows fuel tanks to withstand penetration by ballistic projectiles without allowing the fuel to either explode or leak from the tank. The protection bladders are also light in weight and relatively easy to manufacture and install even where a conduit must penetrate a wall of the fuel tank. Although the inventive ballistic protection bladder has been described for use with the fuel tanks of aircraft, it will be understood that it may also be advantageously used in any application in which a fuel tank may be exposed to puncture by ballistic projectiles of any variety.

We claim:

1. An apparatus for protecting a fuel tank from explosion and leaking after penetration by a ballistic projectile, comprising a flexible bladder lining the inside of said tank, said bladder being filled with a pressurized inert gas.

2. The apparatus of claim 1 wherein said bladder further includes nonresilient webs extending from one side of said bladder to the other to control the thickness of said bladder when said bladder is pressurized by said inert gas.

3. The apparatus of claim 1, further including gas supply means for supplying bladder with said pressurized inert gas, said apparatus further including a relief valve in said bladder opening into the interior of said tank so that the ullage space of said tank is filled with said inert gas.

4. The apparatus of claim 1, further including gas supply means for supplying said bladder with said pressurized inert gas, said gas supply means depressurizing said bladder to collapse said bladder when said tank is full of fuel and then pressurizing said tank to expand said bladder as fuel is removed from said tank.

5. The apparatus of claim 1 wherein a conduit penetrates said tank and extends through said bladder, and wherein said bladder includes a pair of walls that are sealed to each other around said conduit in the area that said conduit extends through said bladder, thereby making it unnecessary to provide a seal between said conduit and the walls of said bladder.

6. The apparatus of claim 5 wherein the interior wall of said bladder forms a lobe around said conduit so that the interior wall of said bladder extends over the portion of said bladder where the walls of said bladder are sealed to each other and closely surrounds said conduit.

7. The apparatus of claim 6 wherein said bladder further includes nonresilient webs extending from one side of said bladder to the other to control the thickness of said bladder when said bladder is pressurized by said inert gas, said webs being absent from the portion of said bladder forming said lobe.

8. The apparatus of claim 5, further including an attachment flange extending radially from said conduit around its circumference, and wherein the walls of said bladder that are sealed to each other around said conduit are attached to said flange, thereby securing said bladder to said conduit.

9. The apparatus of claim 8, further including a second attachment flange extending radially from said conduit around its circumference, said flanges tightly gripping the walls of said bladder that are sealed to each other between said flanges.

10. The apparatus of claim 1, further including gas supply means for continuously supplying said bladder with said pressurized inert gas so that in the event said bladder is punctured by a ballistic projectile, the gas escaping from said bladder prevents fuel from escaping through the puncture in said bladder.

11. The apparatus of claim 1 wherein said fuel tank is lined with a plurality of nonoverlapping bladders that are penumatically isolated from each other so that a puncture of one of said bladders does not affect the pressurization of the remaining bladders.

12. The method of protecting a fuel tank from explosion and leaking after penetration by a ballistic projectile, comprising lining the inside of said tank with a flexible, fluid-impermeable bladder and filling said bladder with a pressurized inert gas.

13. The method of claim 12, further including the steps of continuously supplying said inert gas to said bladder and venting said gas from said bladder into the interior of said tank so that the ullage space of said tank is filled with said inert gas.

14. The method of claim 12, further including the steps of depressurizing said bladder to collapse said bladder when said tank is full of fuel and then pressurizing said tank to expand said bladder as fuel is removed from said tank.

15. The method of claim 12 wherein a conduit penetrates said tank and extends through said bladder, and wherein said method further includes the step of sealing the walls of said bladder to each other around said conduit, thereby making it unnecessary to provide a seal between said conduit and the walls of said bladder.

16. The method of claim 12, further including the steps of continuously supplying said bladder with said pressurized inert gas so that in the event said bladder is punctured by a ballistic projectile, the gas escaping from said bladder prevents fuel from escaping through the puncture in said bladder.

* * * * *

UNITED STATES PATENT AND TRADEMARK OFFICE
CERTIFICATE OF CORRECTION

PATENT NO. : 4,925,057
DATED : May 15, 1990
INVENTOR(S) : James J. Childress et al.

It is certified that error appears in the above-identified patent and that said Letters Patent is hereby corrected as shown below:

In claim 3, column 5, line 60, after "supplying" please insert --said--.

In claim 11, column 6, line 39, please delete "penumatically" and substitute therefor --pneumatically--.

In claim 12, colum 6, line 42, please delete "The" and substitute therefor --A--.

Signed and Sealed this

Twelfth Day of November, 1991

Attest:

HARRY F. MANBECK, JR.

*Attesting Officer*  *Commissioner of Patents and Trademarks*